United States Patent [19]

Sakamoto

[11] Patent Number: 4,817,041
[45] Date of Patent: Mar. 28, 1989

[54] ELECTRONIC CASH REGISTER WITH CHANGE DISCHARGER

[75] Inventor: Nobuyoshi Sakamoto, Nagaokakyo, Japan

[73] Assignee: Omron Teteisi Electronics, Kyoto, Japan

[21] Appl. No.: 116,347

[22] Filed: Nov. 4, 1987

Related U.S. Application Data

[63] Continuation-in-part of Ser. No. 4,792, Jan. 8, 1987, abandoned, which is a continuation of Ser. No. 590,572, Mar. 16, 1984, abandoned.

[30] Foreign Application Priority Data

Mar. 17, 1983 [JP] Japan .................................. 58-46753

[51] Int. Cl.$^4$ ........................................... G06F 15/20
[52] U.S. Cl. ..................................... 364/405; 235/379
[58] Field of Search ..................... 364/405, 403, 404; 235/379, 382

[56] References Cited

U.S. PATENT DOCUMENTS 3,760,158  9/1973  Whilehead et al. ........... 235/61.6 R
4,191,999  3/1980  Kashio .............................. 364/405
4,450,526  5/1984  Nakatani et al. .................... 364/405

Primary Examiner—Jerry Smith
Assistant Examiner—Kim Thanh Tbui
Attorney, Agent, or Firm—Foley & Lardner, Schwartz, Jeffery, Schwaab, Mack, Blumenthal & Evans

[57] ABSTRACT

An electronic cash register is disclosed that is operable with a change discharger that discharges a plurality of unit amounts of money. The electronic cash register includes a RAM, in which a minimum unit amount of money to be paid back by an operator to a customer is stored. After input by the operator of data relating to purchased commodities as well as data related to the amount tendered by the customer, a CPU calculates the total amount of change to be dispensed to the customer. The CPU further calculates, based on the total amount of change and the minimum unit amount of money to be paid by the operator, the portion of the total change that should be dispensed by the change discharger and the amount to be dispensed by the operator. The amount to be dispensed by the operator is displayed on an indicator, thereby alleviating the necessity of the operator to mentally calculate the difference between the total amount of change to be dispensed and the amount dispensed by the change discharger. An indicator also displays the total amount of change to be dispensed for the customer's convenience.

5 Claims, 5 Drawing Sheets

FIG.3

| TOTAL AMOUNT PER TRANSACTION (IM) | 41 |
| --- | --- |
| NUMERICAL BUFFER (NBUF) | 42 |
| CHANGE AMOUNT (CHANGE) | 43 |
| MINIMUM NOTE UNIT (LIMIT) | 44 |
| REGISTER 1 | 45 |
| REGISTER 2 | 46 |
| REGISTER 3 | 47 |
| FKN | 48 |
| FSITM | 49 |

FIG.4

100  [SUB-TOTAL]

FIG.5

1100  [DEPARTMENT]

246  [DEPARTMENT]

[SUB-TOTAL]

2000  [CASH]

FIG.6

```
LIMIT = 100
```

FIG.7

```
DEPARTMENT    1100

DEPARTMENT     246

TOTAL         1346
RECEIVED      2000

CHANGE         654

| DEPARTMENT | 1100 |

FIG.9A

| CHANGE | 654 |

FIG.9B

| CHANGE IN NOTE | 600 |

ELECTRONIC CASH REGISTER WITH CHANGE DISCHARGER

This application is a continuation-in-part of application Ser. No. 004,792 filed Jan. 8, 1987 which in turn is a continuation of Ser. No. 590,572 filed on Mar. 16, 1984, both now abandoned.

BACKGROUND OF THE INVENTION

1. Field of the Invention

The present invention relates to an electronic cash register (hereinafter referred to as "ECR") operable with a change discharger, and more particularly, to an ECR operable with a change discharger which discharges at least a portion of the total change to be paid to a customer.

2. Description of the Prior Art

Recently, ECRs have been provided having a change discharger for promptly making change to a customer. When, in such an ECR, the customer submits a 10,000 yen note for a registered total amount of, e.g., 4,370 yen, the change in amount of 5,630 yen is indicated on an indicator with respect to inputted payment of 10,000 yen. At this time, the change discharger discharges 630 yen. An operator then must make a mental calculation, upon confirming the discharged amount of 630 yen, on the outstanding amount of 5,000 yen to take out 5,000 yen in notes from a cash drawer for making change to the customer.

Thus, in such a conventional ECR, the operator must mentally calculate the difference between the total amount to be paid back as the change and the amount discharged from the change discharger, creating apprehension that the operator might miscalculate the amount of change the operator must pay to the customer.

SUMMARY OF THE INVENTION

Accordingly, an essential object of the present invention is to provide an electronic cash register provided with a change discharger which can calculate the difference between the total amount of change to be paid back to the customer and the amount discharged from the change discharger, thereby to indicate the difference on an indicator.

In the electronic cash register according to the present invention, data of a minimum unit of money to be paid back by the operator as change to a customer is stored in advance. Upon cash payment by the customer, the total amount of change is calculated in response to a command from a change command means based on the amount received from the customer and the registered total amount of purchased articles. Based on the results of the calculation and the minimum unit of money, the amount discharged from the change discharger and the amount to be paid back by the operator to the customer is determined. The amount to be paid back by the operator is displayed on an indicator.

Thus, according to the present invention, the operator can readily comprehend the difference between the amount received from the customer and the amount discharged from the change discharger by merely viewing the amount indicated on the indicator, thereby leading to effective prevention of miscalculation of the change. Further, the total amount of change to be dispensed is also displayed on an indicator for the convenience of the customer.

The above object and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an explanatory diagram showing data stored in a RAM shown in FIG. 1;

FIG. 4 is an illustration showing the procedure of key operation for setting data of a minimum unit of coin;

FIG. 5 is an illustration showing the procedure of key operation in a normal registration process;

FIG. 6 is an illustration showing an example of printing of data set as the minimum unit of coin;

FIG. 7 is an illustration showing an example of printing in a normal registration process;

FIG. 8 is an illustration showing an example of indication in department registration;

FIGS. 9A and 9B illustrate the display of the operator change amount and the total amount of change on indicators.

DETAILED DESCRIPTION OF THE PREFERRED EMBODIMENTS

Figure 1:
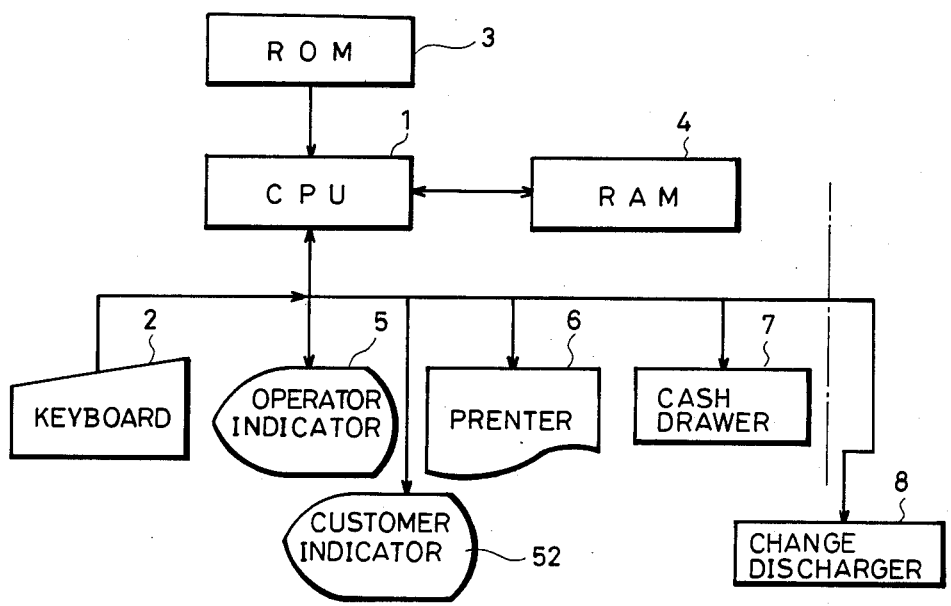
FIG. 1 is a block diagram schematically showing an embodiment of the present invention.

FIG. 1 is a block diagram schematically showing an embodiment of the present invention. In FIG. 1, a CPU (central processing unit) 1 functions as a calculation control means, and is connected to a keyboard 2, a ROM (read-only memory) 3, a RAM (random access memory) 4, an indicator 5, an indicator 52, a printer 6, a cash drawer 7 and a change discharger 8. The CPU 1 performs predetermined calculation and control based on a program stored in advance in the ROM 3. As hereinafter described in detail with reference to FIG. 2, the keyboard 2 is used to input information relating to purchased articles. The RAM 4 functions to store various data, and comprises a total amount data storage means, a received amount data storage means and a minimum unit amount data storage means. The indicator 5 indicates unit amount information on respective purchases and total amount information. The printer 6 prints the indicated unit amount data and total amount data. The cash drawer 7 keeps coins received from customers and change money, etc., and is automatically opened upon operation of a cash key 24 as described subsequently. The change discharger 8 discharges the total amount or a part of the change to be paid back to the customer.

Figure 2:
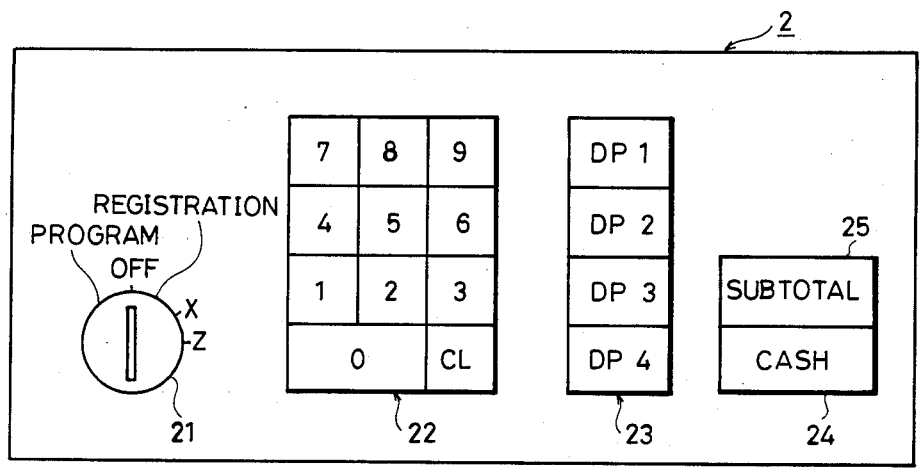
FIG. 2 is an illustration showing keyboard arrangement.

FIG. 2 is illustrative of arrangement of keys in the keyboard 2 as shown in FIG. 1. In FIG. 2, the keyboard 2 includes a mode selection switch 21, ten keys 22, department keys 23, the cash key 24 and a subtotal key 25. The mode selection switch 21 selects one of modes, such as a program mode, a mode for turning off the ECR, a registration mode, an inspection mode X and an adjustment mode Z. The ten keys 22 are used for inputting unit amount data of purchased articles, etc. The department keys 23 are for inputting department codes of the purchased articles, and the cash key 24 is operated for totalling cash received from the customer, while the subtotal key 25 functions to command calculation in total of the unit amount data theretofore inputted.

FIG. 3 is an explanatory diagram showing the data stored in the RAM 4 as shown in FIG. 1. In FIG. 3, the RAM 4 includes storage regions 41 to 49. The storage region 41 stores the total amount IM of a single transaction processing for each customer. The storage region 42 is a numerical buffer (NBUF) for temporarily storing numerical data inputted from the ten keys 22. The storage region 43 stores the amount of change, CHANGE. The storage region 44 stores data, LIMIT indicating the minimum unit of change to be paid back by the operator. The storage regions 45, 46 and 47, respectively, function as registers 1 to 3 for storing data required for calculation of the data of the amount to be discharged from the change discharger and the data of the amount to be paid back by an operator. The storage region 48 stores a flag, FKN, indicating that the ten keys 22 have been operated. The storage region 49 stores a flag, FSITM, indicating that the department keys 23 have been operated.

Figure 10:
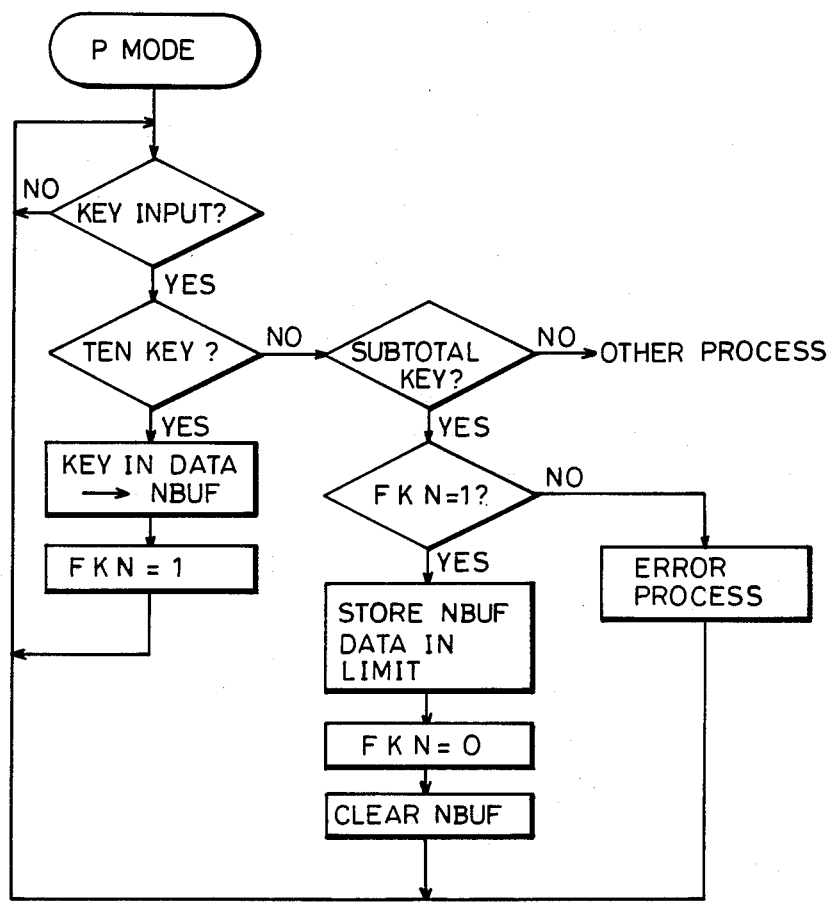
FIGS. 10 and 11 are flow charts definitely showing operation of the embodiment of the present invention.
Figure 11:
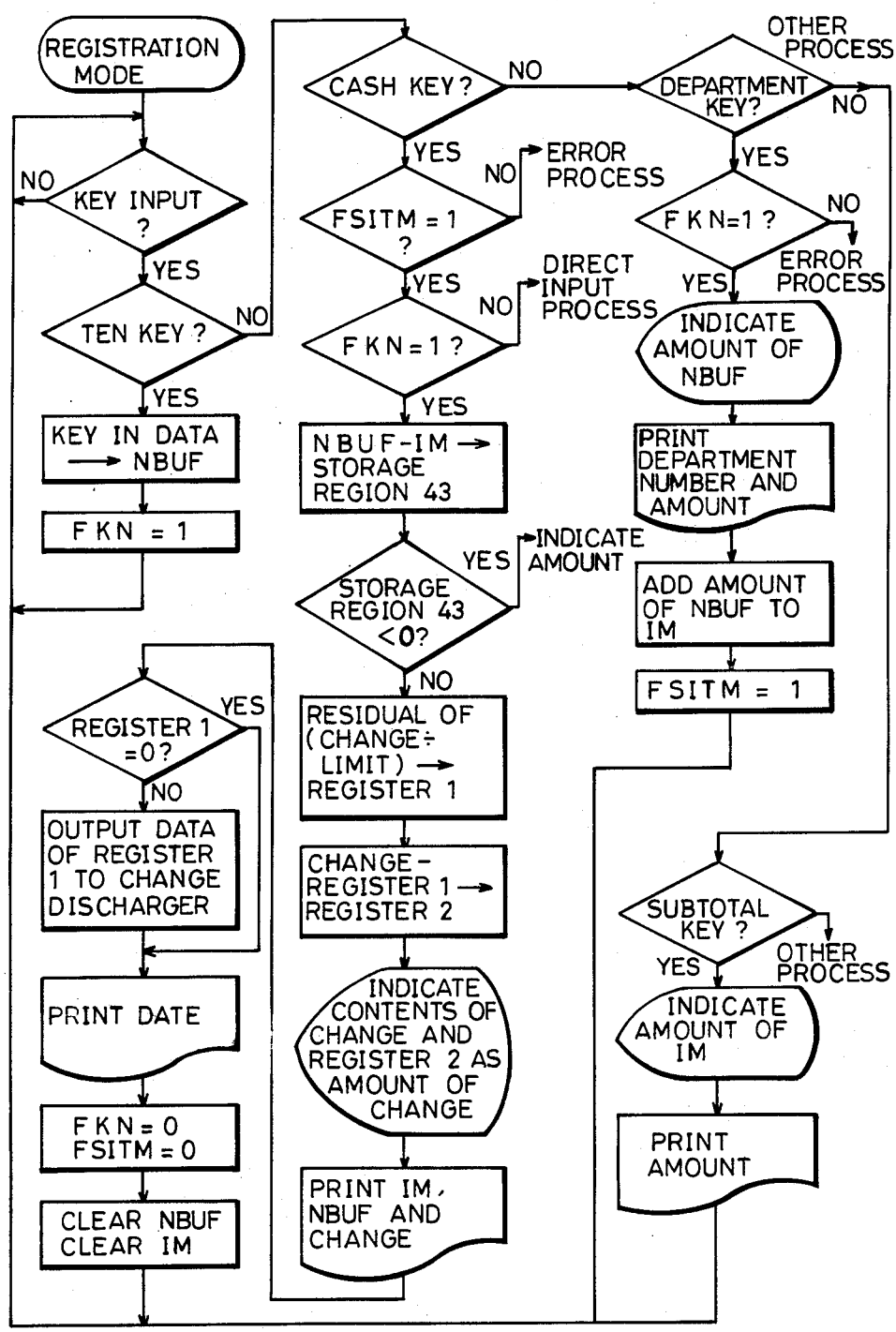

FIG. 4 is illustrative of the procedure of key operation for setting the minimum unit of notes; FIG. 5 is illustrative of the procedure of key operation for normal registration; FIG. 6 is an illustration showing an example of printing in setting of the minimum note unit; FIG. 7 is illustrative of an example of printing in a normal registration process; FIG. 8 is an illustration showing an example of indication of department registration; FIG. 9 is an illustration showing an example of indication of change; and FIGS. 10 and 11 are flow charts for specifically showing the operation of an embodiment of the present invention in which, in particular, FIG. 10 shows the operation for setting minimum unit data of coins and FIG. 11 shows operation in a normal registration process.

Referring to FIGS. 1 to 11, operation of one embodiment of the present invention will be now described in detail.

For setting the minimum unit data of notes, the mode selection switch 21 is switched by the operator to set the program mode. Then the keyboard 2 is operated according to the key operation procedure as shown in FIG. 4. That is, assuming that the unit of coin discharged from the change discharger 8 is smaller than 10 yen and the minimum unit of coin to be paid back by the operator as the change is larger than 100 yen, a numerical data "100" is inputted from the ten keys 22. The CPU 1 determines that the numerical data has been inputted by the ten keys 22 upon receipt of a key input signal from the keyboard 2. Correspondingly, the inputted numerical data is stored in the numerical buffer NBUF 42 and the flag FKN is set in the storage region 48. Then, when the subtotal key 25 is operated by the operator, the CPU 1 receives this operation of the subtotal key 25 and determines whether or not the flag FKN is set in the storage region 48. If the flag FKN is set in the storage region 48, the numerical data "100" stored in the numerical buffer NUBUF 42 is transferred to and stored in the storage region 44. Thereafter, the flag FKN in the storage region 48 as well as the numerical buffer NBUF 42 are cleared. If the flag FKN is not set in the storage region 48 in spite of the operation of the subtotal key 25, an error process is performed.

Operation in a normal registration mode will be described.

First, the mode selection switch 21 is operated by the operator to set a registration mode. Then, data relating to purchased articles, i.e., unit amount data and department codes, are inputted by the ten keys 22 according to the key operation procedure as shown in FIG. 5. When the unit amount data are thus inputted from the ten keys 22, the CPU 1 receives the key input signal and determines whether or not the input is made by the ten keys 22. If the determination is "yes", the inputted numerical data is stored in the numerical buffer 42 and the flag FKN is set in the storage region 48. Then, when the department key 23 is operated by the operator, the CPU 1 detects this operation of the department key 23, and determines whether or not the flag FKN is set in the storage region 48. If, in spite of the operation of the department key 23, the flag FKN has not been set in the storage region 48, an error process is performed. When, to the contrary, the flag FKN is set in the storage region 48, the content of the numerical buffer NBUF 42 is indicated on the indicator 5 as shown in FIG. 8. As shown in FIG. 7, the department codes and the amounts are printed by the printer 6. Further, the content of the numerical buffer NBUF 42 is added to the content of the storage region 41. Then the flag FSITM is set in the storage region 49 so as to indicate that department registration has been performed. Such operation is repeated so as to successively register data of commodities purchased by the customer.

When the operator operates the subtotal key 25, the total amount stored in the storage region 41 is indicated on the indicator 5 and printed on a receipt by the printer 6, so that the customer views the indicated total amount and pays therefor in cash. The operator receives the cash from the customer and inputs the received amount data by the ten keys 22. The received amount data is stored in the numerical buffer NBUF 42. Then, the operator operates the cash key 24. The CPU 1 determines that the cash key 24 has been operated, and then, the CPU 1 determines whether or not the flag FSITM indicating the performance of the department registration is set in the storage region 49. If the determination is "no", an error process is performed. If the flag FSITM is set in the storage region 49, then a determination is made as to whether or not the flag FKN is set in the storage region 48, and if the determination is "yes", change amount data is calculated by subtracting the total amount data in the storage region 41 from the received amount data stored in the numerical buffer NBUF 42. The calculated change amount data is stored in the storage region 43.

The CPU 1 determines whether or not the data stored in the storage region 43, i.e., the change amount, is less than zero. If the determination is "yes", that is, the amount received from the customer is less than the total amount, a process is performed, e.g., for indicating the deficiency, which is to be viewed and paid for by the customer. If the determination is "no", the change amount data stored in the storage region 43 is divided by the minimum unit data of notes stored in the storage region 44. The residual of the result of the division is stored in the register 1, which is the data of the amount to be discharged from the change discharger 8. Further, in the CPU 1, the content of the register 1 in the storage region 45, i.e., the data of the amount discharged from the change discharger 8 is subtracted from the change amount data in the storage region 43, so that the data of the amount to be paid back by the operator is calculated, which in turn is stored in the register 2 of the storage region 46.

The change amount data stored in the storage region 43, that is, the total amount data of the change amount to be paid by the operator and the change amount to be discharged by the change discharger are indicated in the customer indicator 52 in a manner shown in FIG. 9A. In addition, the change amount data to be paid by the operator, which is stored in the register 2, is indicated in a manner shown in FIG. 9B.

The CPU 1 further supplies the printer 6 with the total amount data stored in the storage region 41, the received amount data stored in the numerical buffer 42 NBUF and the change amount data stored in the storage region 43, which in turn are printed as shown in FIG. 7.

The CPU 1 determines whether or not the content of the register 1 of the storage region 45 is zero, i.e., whether or not the data to be supplied to the change discharger 8 is zero. If the determination is "no", that is, data is to be supplied with the change discharger 8, the change discharger 8 is supplied with the content of the register 1 to discharge the subject change. If no data is to be supplied to the change discharger 8, a date, etc. is printed without supplying any data to the change discharger 8, and the CPU 1 clears all of the flags FKN and FSITM in the storage regions 48 and 49, the numerical buffer NBUF in the storage region 42 and the content of the storage region 41, thereby to return to the initial state.

Since, according to the present embodiment as hereinabove described, the total amount data of registered purchased commodities is subtracted from the data of the amount received from a customer to calculate the change amount data, which in turn is divided by the minimum unit data of coin to be paid back by the operator so that the residual in the result of the calculation is supplied to the change discharger 8 and the data of the change amount to be paid back by the operator is indicated on the indicator 5, miscalculation by the operator is effectively prevented with respect to the coin to be taken out from the cash drawer 7 in addition to that discharged from the change discharger 8.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic cash register, operable with a change discharger capable of discharging a plurality of unit amounts of money that discharges at least a portion of the total change to be paid to a customer, said electronic cash register comprising:
input means for inputting data relating to purchased commodities;
total amount data storage means for accumulatively storing unit amount data of commodities purchased by said customer in response to inputs from said input means;
received amount data storage means for storing data of an amount received from said customer, said amount received data being input from said input means;
change calculation command means for commanding calculation of change;
minimum unit amount data storage means for storing data indicative of a minimum unit amount of money to be paid back by an operator to said customer;
means for setting any desired amount as said minimum unit amount stored in said minimum unit amount data storage means;
calculation control means for calculating a total change amount data based on the contents of said received amount data storage means and the contents of said total amount data storage means in response to a command from said change calculation command means, and for calculating, based on said total change amount data and said minimum unit amount data stored in said minimum unit amount data storage means, an operator change amount data indicative of the amount of change to be paid back by said operator; and
indication means for receiving and separately displaying the total change amount data and operator change amount data calculated by said calculation control means, said total change amount data being different than said operator change amount data;
said change discharger being commanded by said calculation control means to discharge a portion of said total change to be received by said customer, said portion being the difference between said total change to be received by said customer and said amount of change to be paid back by said operator, wherein the largest unit amount of money to be discharged by said change discharger is less than said minimum unit amount of money to be paid back by said operator.

2. An electronic cash register as claimed in claim 1, wherein said indication means comprises a customer indicator unit for displaying said total amount of change and an operator indicator unit for displaying said amount of change to be paid back by said operator.

3. An electronic cash register as claimed in claim 1, wherein said calculation control means includes:
dividing means for dividing said total change amount data by said minimum unit amount data, the resulting residual of the division being the discharge amount data that is indicative of the amount of change to be discharged from said change discharger; and
subtracting means for subtracting said discharge amount data from said total change data, the resulting difference being said operator change amount data.

4. An electronic cash register as claimed in claim 1, where said setting means includes said input means.

5. A method of operating an electronic cash register, operable with a change discharger, capable of discharging a plurality of unit amounts of money, that discharges at least a portion of the total change to be paid to a customer, said electronic cash register comprising:
inputting data relating to purchased commodities with an input unit;
accumulatively storing unit amount data of commodities purchased by said customer in response to inputs from said input unit in a total amount data storage unit;
storing data of an amount received from said customer in a received amount data storage unit, said amount received data being input with said input unit;
commanding calculation of change with a change calculation command unit;

storing data indicative of a minimum unit amount of money to be paid back by an operator to said customer in a minimum unit amount data storage unit;

setting any desired amount as said minimum unit amount stored in said minimum unit amount data storage unit;

calculating a total change amount data, with a calculation control means, based on the contents of said received amount data storage unit and the contents of said total amount data storage unit in response to a command from said change calculation command unit, and calculating, based on said total change amount data and said minimum unit amount data stored in said minimum unit amount data storage unit, an operator change amount data indicative of the amount of change to be paid back by said operator;

receiving and separately displaying on an indication unit the total change amount data and operator change amount data calculated with said calculation control means, said total change amount data being different than said operator change amount data;

commanding said change discharger with said calculation control unit to discharge a portion of said total change to be received by said customer, said portion being the difference between said total change to be received by said customer and said amount of change to be paid back by said operator, wherein the largest unit amount of money to be discharged by said change discharger is less than said minimum unit amount of money to be paid back by said operator.

* * * * *